G. A. DE GRAFF.
HOSE CLAMP TOOL.
APPLICATION FILED JULY 12, 1919.

1,330,431.

Patented Feb. 10, 1920.

Inventor
GEORGE A. DE GRAFF
By his Attorney

UNITED STATES PATENT OFFICE.

GEORGE A. DE GRAFF, OF MILWAUKEE, WISCONSIN, ASSIGNOR OF ONE-HALF TO HENRY J. SMITH, OF CHICAGO, ILLINOIS.

HOSE-CLAMP TOOL.

1,330,431.　　　　　　Specification of Letters Patent.　　Patented Feb. 10, 1920.

Application filed July 12, 1919. Serial No. 310,472.

*To all whom it may concern:*

Be it known that I, GEORGE A. DE GRAFF, a citizen of the United States, and a resident of Milwaukee, in the county of Milwaukee and State of Wisconsin, have invented new and useful Improvements in Hose-Clamp Tools, of which the following is a full, clear, and exact description.

Among the principal objects which the present invention has in view are: to provide means for rapidly applying a wire cinch or clamp on hose for attaching same to nozzles or coupling fittings; to provide means for tightening the cinch or clamp; and to simplify the method of applying the cinch to the hose.

Drawings.

Description.

The character of hose for which the present invention is more particularly adapted is that known as pneumatic hose. The pneumatic hose which is used for operating pneumatic tools or for delivering air under pressure experience difficulty, in that the internal pressure tends to open the ends of the hose where they are joined to splicing couples or to the nozzles or tools which are being supplied by them. Clamps of various character have been devised and employed. An unsatisfactory feature in such employment has existed, in that it has been found difficult to obtain the closed and most complete adjustment which is sometimes essential.

Most operators prefer the old style of winding the hose with wire or other pliable strand which can be drawn on the hose without any reference to predetermined operating positions or relations. The difficulty which has arisen in the use of the wire has been the inability to obtain the necessary strain on the wire to bed it in the hose and to constrict the hose sufficiently to hold it on the coupling against the excess internal pressure of the air or other fluid.

Figure 4:
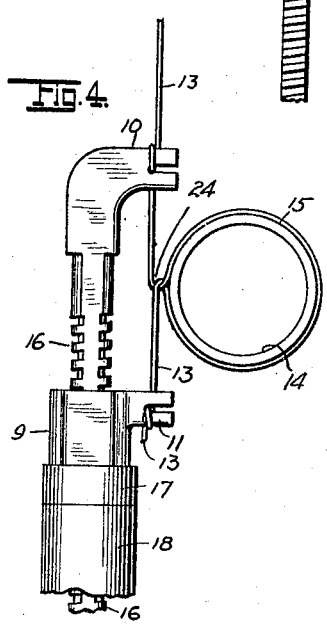
Fig. 4 is a view showing a fragment of the tool and in conjunction therewith, a section of hose, and cinch or clamp being applied thereto.
Figure 5:
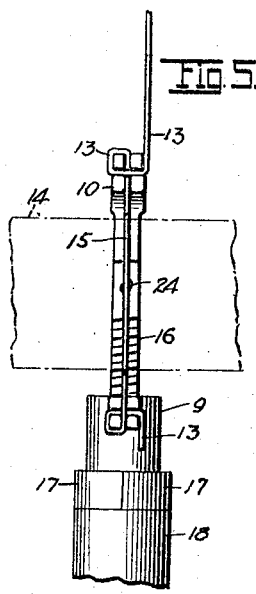
Fig. 5 is a side view of the same showing by broken lines the disposition of the hose with relation to the tool.

As seen in the drawings, two looping heads 10 and 11 are provided, each furnished with deep seated cross slots 12. The slots 12 as shown in Figs. 4 and 5 of the drawings are provided for threading the cinch wire 13. By passing the wire through the transverse slot and then returning it though the longitudinal slot of each of the heads, a perfect snubbing grip is provided on the two heads.

As shown best in Fig. 4 of the drawings the attachment of the free end of the winding attachment is first made on the head 11. The hose 14 is then disposed in position between the extended heads 10 and 11, and the wire 13 is wrapped circularly or spirally about the hose and drawn normally tight and passed through the slots 12 in the head 10, forming the snubbing hitch above described and that shown in the drawings. The hitches thus made in the heads 10 and 11 prevent the slippage of the wire, when the two heads are forced apart to produce the necessary strain or pull on the wire 13 and the loop 15 formed thereby.

Figure 1:
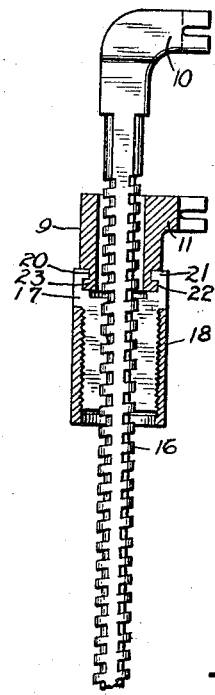
Figure 1 is a longitudinal section of a tool constructed and arranged in accordance with the present invention.
Figure 2:
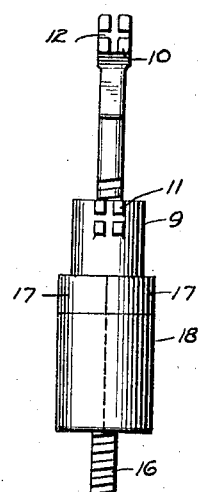
Fig. 2 is a side view of the tool.
Figure 3:
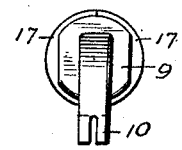
Fig. 3 is an end view of the same.

As seen best in Fig. 1 of the drawings, the head 11 is laterally extended from a flattened screw-threaded shank 16. The segmental threads on the shank 16 are pitched so as to produce relatively large movement of the shank when the nut formed by the split segments 17 is rotated.

The split segments 17 each have a complete half section of the thread that corresponds with the thread on the shank 16. The segments 17 are held rigidly in working relation by a screw-threaded sleeve 18 to accommodate the fine thread of which the outer surface of the joined segments 17 is threaded. When the sleeve 18 is in working position relative to the segments 17, the nut and the threads of the shank 16 are advanced or retracted therethrough.

The head 11 is held on a sliding member 9. The sliding member 9 is cylindrical in form and has a groove 20 therein to receive the flanges 21 formed on the segments 17. The segments 17 have grooves 22 to receive the flange 23 formed at the end of the sliding member 9.

After forming the loop 15 about the pipe 14, and after having secured the wire to the heads 10 and 11 by the hitches therein described, if the operator turns the handle nut having the segments 17, the heads 10 and 11 are supported or drawn together, as the case may be. The usual operation is to support the two heads to exert a pulling strain on the wire 13 upon the loop 15 formed thereby. The screw jack principle employed enables the operator to exert great strain on the wire 13, sufficient to bed the same into the body of the hose, and to draw the hose inseparably upon the coupling or tool fixture. When the strain has been thus imposed, the tool is swung a half or complete circle, with the result that a twist such as indicated by the numeral 24 in Fig. 4 of the drawings if formed, which ties the ends of the loop 15 to prevent any subsequent opening of the said loop 15. In this position, the wire 13 may be severed either inside or outside of the heads 10 and 11, and the winding twist 24 may be clipped or further perfected. The tool is then ready for a further operation.

It is obvious that by moving the sliding member 9 to and fro on the shank 16, the heads 10 and 11 may be gapped in adjustment for any size of pipe preliminary to forming the binding loop or cinch.

Claims.

1. A tool as characterized comprising a plurality of slidably connected rigid members, said members having mutually alined engaging devices for fixedly holding a pliable wrapping member; power multiplying means operatively engaging said rigid members to separate the same for imparting a pulling strain on said wrapping member, said means embodying a nut formed of a plurality of segments having a series of corresponding thread sections formed thereon for engagement with a threaded shank of the opposite rigid member; and a cylindrical collar thread-engaged with the exterior of said segments for retracting the combined sections in the form of a nut.

2. A tool as characterized comprising a plurality of slidably connected rigid members, each of said members being provided with laterally extended slots formed in the ends thereof for holding a pliable wrapping member, one of said rigid members having thread sections formed at the edges thereof, said member being oblong in cross section, and a nut thread-engaged with said shank, said nut consisting of a plurality of segments forming a split nut, the threads whereof aline and correspond with the threads on said shank; and a sleeve threaded to engage threads on the exterior of said segments for holding said segments together and for operating the nut formed thereby.

3. A tool as characterized comprising an elongated rigid member having a shank rectangular in cross section, said member having a laterally extended head at the extremity thereof, said head being provided with perpendicularly disposed slots in the end thereof for holding a pliable member; a slidable member having a laterally extended head, said head corresponding to the head on the first mentioned member for coöperating therewith to hold a section of said wrapping member, said second member having a groove at the extremity thereof; a split nut having adjacent members for said groove in said second mentioned member, said split nut having interior grooves for fitting the groove sections of said shank, the exterior of said nut being provided with fine threads; and a cylindrical collar engaging said nut and the threads on the outer side thereof for retracting the second mentioned rigid member.

GEORGE A. DE GRAFF.